United States Patent
Khandkar et al.

[11] Patent Number: 5,958,304
[45] Date of Patent: Sep. 28, 1999

[54] DOPED LANTHANUM CHROMITE MATERIAL FOR BIPOLAR INTERCONNECTS FOR SOLID OXIDE FUEL CELLS

[75] Inventors: Ashok C. Khandkar; Christopher E. Milliken, both of Salt Lake City; Singaravelu Elangovan, Sandy; Joseph J. Hartvigsen, Kaysville, all of Utah

[73] Assignee: Gas Research Institute, Chicago, Ill.

[21] Appl. No.: 08/822,296

[22] Filed: Mar. 21, 1997

Related U.S. Application Data

[63] Continuation-in-part of application No. 08/396,077, Feb. 28, 1995, Pat. No. 5,614,127, which is a continuation of application No. 08/080,924, Jun. 21, 1993, abandoned.

[51] Int. Cl.$^6$ .............................. H01B 1/08; H01M 2/22
[52] U.S. Cl. .............................. 252/519.15; 252/521.1; 429/33; 429/160
[58] Field of Search .............................. 252/518.1, 519.1, 252/519.15, 521.1; 423/595, 596; 429/33, 160

[56] References Cited

U.S. PATENT DOCUMENTS

| | | | |
|---|---|---|---|
| 3,330,697 | 7/1967 | Pechini | 117/215 |
| 3,974,108 | 8/1976 | Staut et al. | 252/521 |
| 4,035,266 | 7/1977 | Alexandrov et al. | 252/512 |
| 4,045,375 | 8/1977 | Komatu | 252/519 |
| 4,133,778 | 1/1979 | Gray | 252/517 |
| 4,305,848 | 12/1981 | Hikita et al. | 252/519 |
| 4,476,196 | 10/1984 | Poeppel et al. | 429/32 |
| 4,476,198 | 10/1984 | Ackerman et al. | 429/32 |
| 4,562,124 | 12/1985 | Ruka | 429/30 |
| 4,816,036 | 3/1989 | Kotchick | 29/623.3 |
| 4,830,780 | 5/1989 | Olson et al. | 252/521 |
| 4,883,497 | 11/1989 | Claar et al. | 29/623.5 |
| 5,009,763 | 4/1991 | Hise | 204/255 |
| 5,387,476 | 2/1995 | Kock et al. | 429/12 |

FOREIGN PATENT DOCUMENTS

| | | |
|---|---|---|
| 447 717 | 9/1991 | European Pat. Off. . |
| 04065354 | 3/1992 | Japan . |
| 04108667 | 4/1992 | Japan . |
| 04135639 | 5/1992 | Japan . |
| 05000844 | 1/1993 | Japan . |
| 07157364 | 6/1995 | Japan . |
| 08083620 | 3/1996 | Japan . |

OTHER PUBLICATIONS

Srilomsak et al "Thermal Expansion Studies on Cathode & Interconnect Oxides", Proc. Int. Symp. Solid Oxide Fuel Cells, 89–11, 1989 (No Month) 129–40.

F.J. Rohr, High–Temperature Fuel Cells; pp. 432–433 Solid Electrolylos 1978 (No Month).

Meadowcroft, Some Properties of Strontium–doped Lanthanum Chromite, Brit. J. Appl. Phys., pp. 1225–1233, 1969, Ser. 2, vol. 2 (No Month).

Chick et al., Air–Sintering Mechanisms of Chromites, Second International Symposium on Solid Oxide Fuel Cells, Commission of the European Communities, L–2920 Luxembourg, EUR–13546EN, pp. 621–628, 1991 (No Month).

*Primary Examiner*—Mark Kopec
*Attorney, Agent, or Firm*—Factor and Shaftal, LLC

[57] ABSTRACT

An improved ceramic interconnect component for a solid oxide fuel cell having good electrical conductivity and thermodynamic stability in the presence of fuel and a coefficient of thermal expansion matching closely that of zirconia electrolytes is disclosed. The interconnect is a lanthanum chromite material including strontium and magnesium as dopants.

5 Claims, 5 Drawing Sheets

DOPED LANTHANUM CHROMITE MATERIAL FOR BIPOLAR INTERCONNECTS FOR SOLID OXIDE FUEL CELLS

The present application is a continuation-in-part of Ser. No. 08/396,077, filed Feb. 28, 1995, now U.S. Pat. No. 5,614,127, which is a continuation of 08/080,924, filed Jun. 21, 1993, now abandoned.

BACKGROUND OF THE INVENTION

1. The Field of the Invention

The instant invention relates to solid oxide fuel cells and particularly to ceramic interconnect materials having good electrical properties.

2. The Prior Art

Solid oxide fuel cells (SOFC'S) are structured to convert the energy of combustion directly to electrical energy. Low molecular weight, residue-free gases, especially natural gas, carbon monoxide, hydrogen and other clean-burning gases, are employed as fuels. A solid electrolyte, e.g. $ZrO_2$, which rapidly transports oxygen ions is an essential component in SOFC's.

Typical SOFC's are illustrated in the following U.S. Pat. Nos.:

4,476,198 Ackerman, et al.

4,816,036 Kotchick 4,476,196 Poeppel, et al.

The fuel cell operation is shown schematically in FIG. 4, wherein oxygen is introduced at the cathode, dissociates to form oxygen ions by picking up electrons from the external circuit. The oxygen ions flow through the electrolyte (which is at an elevated temperature ~ 700° C. or more) to combine with hydrogen, for example, in a combustion reaction (exothermic). The electrochemical heat of reaction and the internal resistance maintains the fuel cell at an efficient operating temperature, i.e., one at which the ceramic electrolyte, typically $ZrO_2$, is an efficient conductor of oxygen ions. The combustion reaction (half cell reaction at the anode) is as follows:

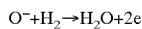

$$O^- + H_2 \rightarrow H_2O + 2e$$

The electrons freed by this reaction are available as electrical energy to perform useful work. The circuit must be complete so that the electrons are available at the cathode-electrolyte interface to participate in the dissociation of oxygen molecules into oxygen ions, as follows:

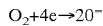

$$O_2 + 4e \rightarrow 2O^-$$

Ceramic interconnect devices interconnect one cell to another electrically and act as channels for both the gaseous fuel and oxygen, as illustrated in FIG. 5. While FIG. 5 shows only two cells connected by a single interconnect, it is typical that a plurality of interconnects are used to form a "stack" of cells, thus serially connecting one cell to another from an electrical standpoint.

The interconnect must be a good conductor of electricity, have a coefficient of thermal expansion (CTE) which closely matches the electrolyte, e.g. zirconia, and be thermodynamically stable simultaneously at high oxygen partial pressures in oxygen or air and low oxygen partial pressures in the fuel gas at cell operating temperatures. Many materials may satisfy one or two of these requirements, but the lack of effective, long lasting interconnects has thus far retarded the development of a commercially usable fuel cell, such as those made of lanthanum strontium chromite (LSC).

The functional requirements of the interconnect in solid oxide fuel cells currently limit the choice of materials to lanthanum chromite based perovskite compositions. Lanthanum chromite exhibits a close thermal expansion match to the zirconia electrolyte and high stability of the wide range of oxygen partial pressures in SOFCs, 0.2 atm on the air side to $10^{-18}$–$10^{-22}$ atm on the fuel side, at cell operating temperatures of 800–1000° C. The required high electronic conductivity can be achieved by appropriately doping the perovskite material with aliovalent dopants. "Aliovalent" for the purposes of the present invention means "of different valence" (or electronic charge) compared to the base elements. For example, in $LaCrO_3$, where La and Cr both nominally have a +3 charge, aliovalent dopants might include Ba, Sr, Ca, Mg, Zn, etc., which have a +2 charge. Alkaline earth dopants such as Sr and/or Ca are typically used to obtain the high conductivity exhibited by these compositions.

These compositions, however, show a loss of lattice oxygen in the fuel atmosphere. Ideally, an interconnect should conduct electrons alone, and not oxygen ions. The formation of oxygen vacancies in such compositions results in diffusion of oxygen ions due to the large chemical potential gradient across the interconnect. This oxygen diffusivity manifests itself as an oxygen leakage current (the amount of oxygen ions per unit area per unit time that permeates through the interconnect material by oxygen ion conduction — this phenomenon may also be called "ionic leakage current"). The mechanism is similar to the transport of oxygen through an electrolyte. This leakage current or ionic conduction is a parasitic loss to the system since no useful energy can be harnessed by the mechanism. The leakage current has, in turn, several effects. First, the cell efficiency is lowered by non-current delivering oxidation of fuel. This is an acute problem in planar SOFCs, in which thinner "web" cross-sections between the cross flow ribs are employed to minimize the ohmic loss in the interconnect. In contrast, tubular design geometries, such as employed by Westinghouse Electric Corporation, facilitate a much smaller exposed area for possible oxygen leakage currents. A second consequence of an oxygen leakage current is a reduction of the Nernst driving force for the current producing electrochemical reaction across the electrolyte, owing to consumption of the fuel and a higher water content. Thus, it is of great interest to understand and minimize the magnitude of oxygen diffusion in such interconnect materials.

In addition to the electrochemical performance penalties, the oxygen leakage behavior also manifests as a structural problem in planar SOFCs. The loss of lattice oxygen results in an expansion of the lattice structure and macroscopic expansion of the sintered ceramic body. Thus in an operating fuel cell the dimension of the interconnect on the fuel side becomes larger than the dimension on the air side resulting in what is termed as 'fuel induced warpage'. The magnitude of such warpage is strongly affected by the lateral dimensions of the fuel cell. For example, finite element analysis indicates that for a chemically induced lattice expansion on the fuel side of 0.2%, an interconnect of 10×10 cm dimension will have a warpage of 0.18 cm at the edge at 1000° C. when exposed to fuel gas on one side and air on the other. This chemical expansion value is typical for a 16% Sr doped lanthanum chromite. The finite element model of a graded chemical expansion through the thickness of the interconnect is shown pictorially in FIG. 6.

Thus conventional alkali earth doped chromites do not function well in SOFC applications. Magnesium doped chromite materials have been disclosed by Westinghouse but suffer from densification problems, requiring either controlled atmosphere sintering or high temperatures. Thus, there is a need to develop an alternative composition of chromite which facilitates ease of sintering, exhibits minimal warpage (i.e., chemical coefficient of expansion), stability and high enough conductivity at operating temperatures.

SUMMARY OF THE INVENTION

An effective, durable interconnect for SOFC's has been invented. The interconnect is a lanthanum strontium calcium chromite, identified herein as LS2C, which preferably contains minor quantities of cobalt and/or iron. The ceramic composition has the following formula:

$$La_{0.99-(w+x)}Sr_wCa_xCr_{1-(y+z)}Co_yFe_zO_3$$

wherein

W(Sr)=0.08 to 0.14

X(Ca)=0.02 to 0.08

Y(Co)=0.00 to 0.05

Z(Fe)=0.00 to 0.05 when W=0.08, X=0.02 and Y and Z=0, then the formula is $$La_{0.89}Sr_{0.08}Ca_{0.02}Cr_{1.0}O_3$$

which is the interconnect material in its simplest compositional form.

The properties of the composition are generally improved for purposes as an interconnect by including a minor amount of cobalt and/or iron with cobalt being a preferred dopant. The composition of this invention provides an interconnect with excellent electrical conductivity in the presence of a fuel gas and a coefficient of thermal expansion which closely matches zirconia, the currently preferred electrolyte material.

BEST MODE FOR CARRY-OUT THE INVENTION

Figure 1:
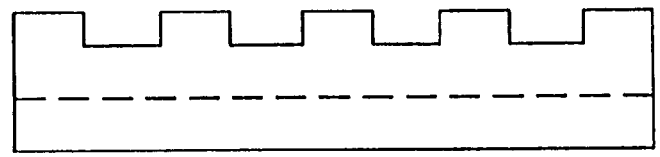
FIG. 1 is an elevational view of an interconnect device.
Figure 2:
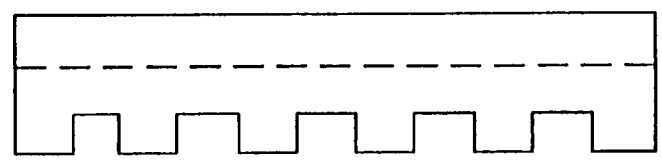
FIG. 2 is an elevational view of the interconnect of FIG. 1 rotated 90° about a vertical axis.
Figure 3:
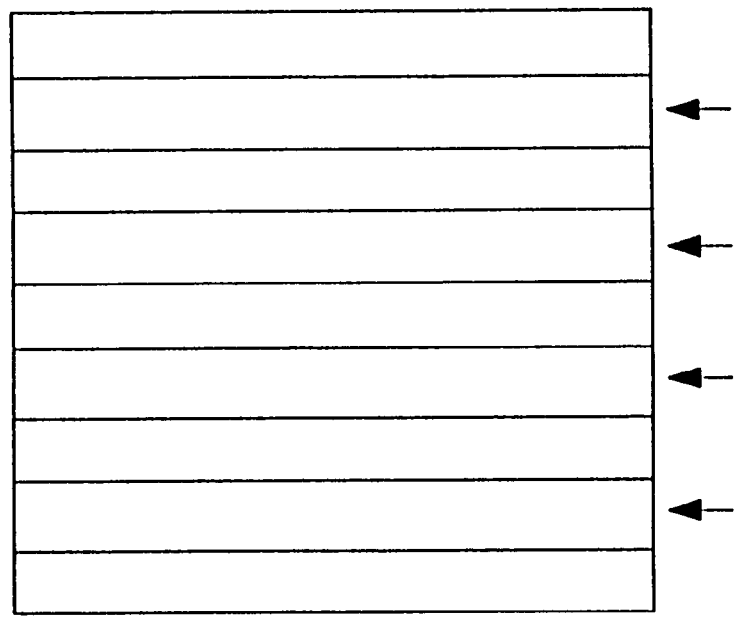
FIG. 3 is a plan view of the interconnect of FIG. 1.
Figure 4:
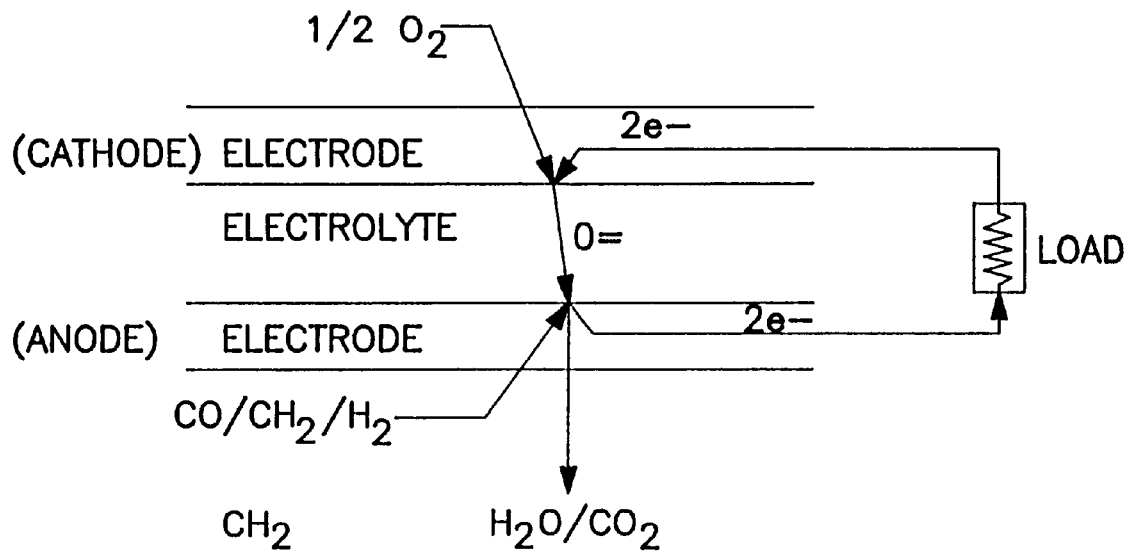
FIG. 4 is a schematic of a fuel cell.
Figure 5:
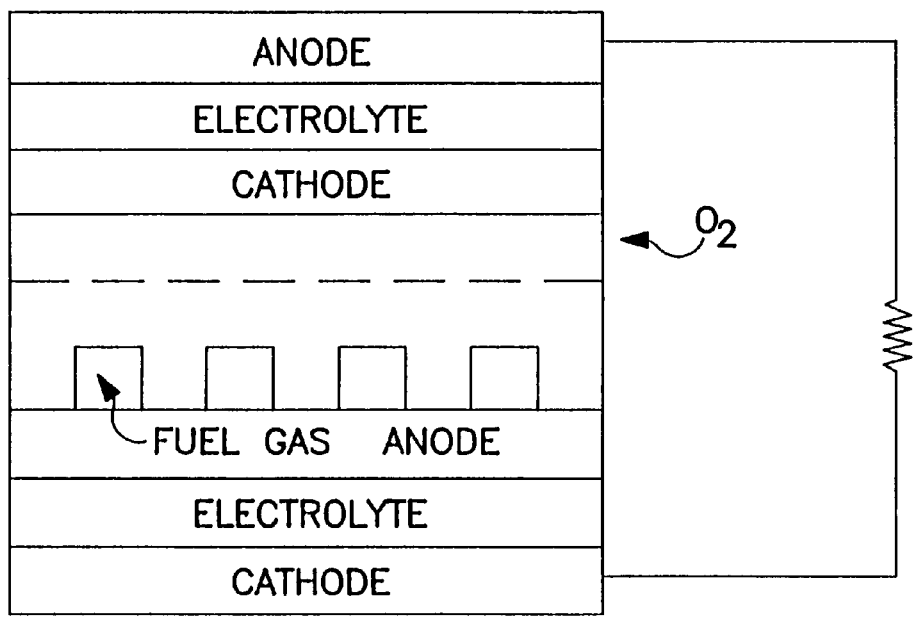
FIG. 5 is a schematic of a two-cell fuel cell with an interconnect.
Figure 6:
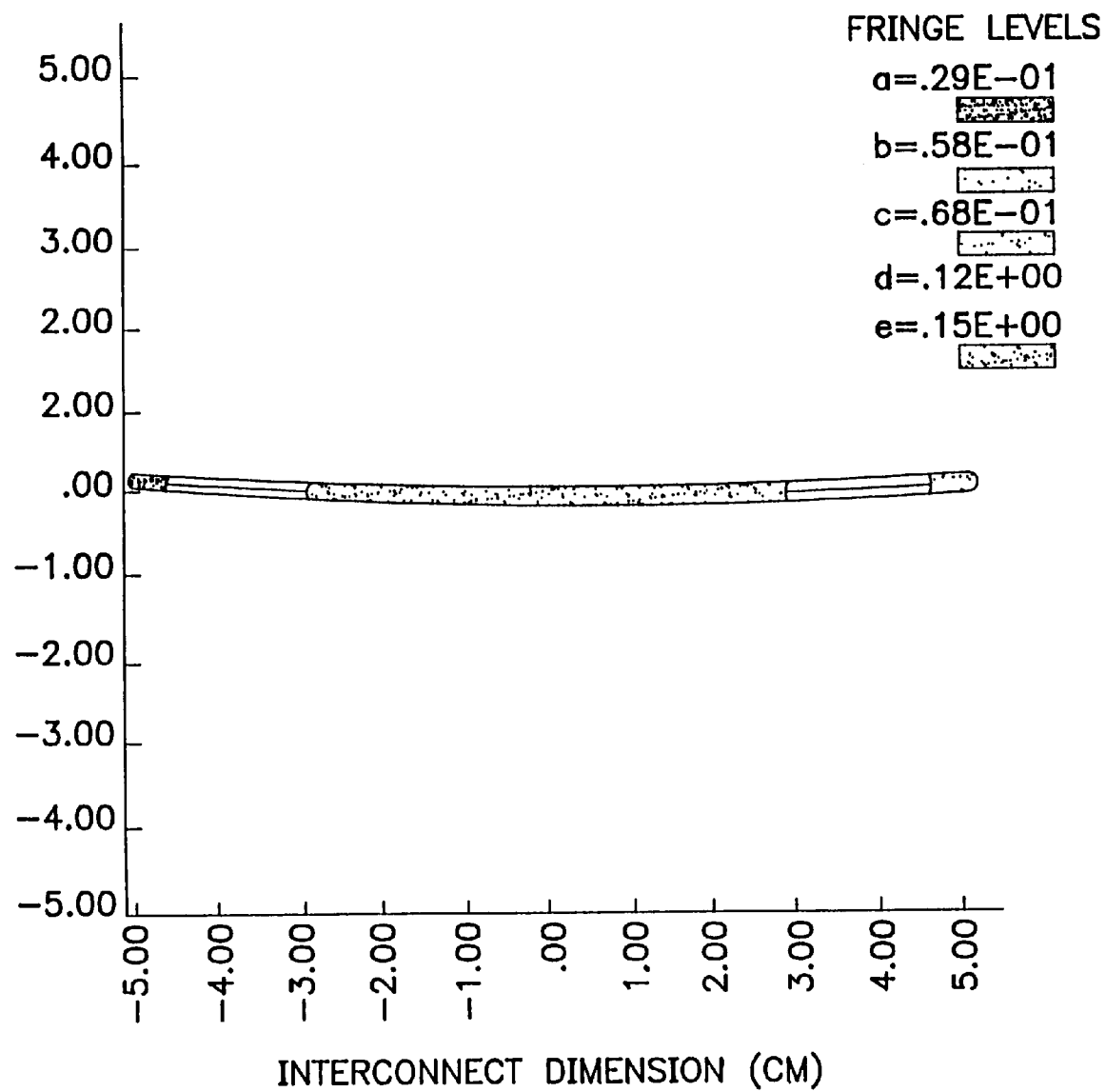
FIG. 6 is a plot of fuel induced warpage in a 10×10 cm interconnect structure.

While this invention is susceptible of embodiment in many different forms there is shown in the drawings and will be described in detail herein several specific embodiments, with the understanding that the present disclosure is to be considered as an exemplification of the principles of the invention and is not intended to limit the invention to the embodiments illustrated.

An improved ceramic interconnect has been invented. The interconnect is composed of a ceramic material which meets the exacting criteria as set forth in the following table:

TABLE 1

| Criterion | Requirement | Failure Mode |
|---|---|---|
| Gas Impermeability | >~95% Density | • Direct Combustion |
| | | • Lower Performance |
| | | • Local Hot Spots |
| Structural Integrity | • No mechanical or Microstructural Degradation | • Cracked Electrolytes |
| | | • Low Stack Performance |
| Electrical Conductivity | >2$\Omega^{-1}$cm$^{-1}$ | • Low Stack Performance |
| Compatible Thermal Expansion (~ZrO$_2$) | 10.5 ± 0.5 × 10$^{-6}$/°C. | • Inadequate bonding |
| | | • Cracked Electrolytes |
| Thermodynamic Stability | • Minimal Change in Conductivity over 50,000 hrs | • Decreased Performance |
| | | • Eventual Stack Failure |

The lanthanum strontium calcium chromite (LS2C) composition of the instant invention meets the criteria set forth in the above table.

While various lanthanum strontium chromite materials have been used for various purposes, the lanthanum strontium calcium chromite compositions as set forth herein have exceptional properties as an interconnect for SOFC's.

The properties of various chromite materials such as lanthanum chromite and yttrium chromite compositions are set forth in Table 2:

TABLE 2

PROPERTIES FOR SELECTED INTERCONNECT MATERIALS

| Composition (Acronym) | Sintering Temp. | Density (% TD) | CTE $10^{-6}/°C.$ | Air Cond. (1/Ωcm) | Fuel Cond. (1/Ωcm) | Sintering Yield (%) |
|---|---|---|---|---|---|---|
| Minimum requirement | <1700° C. | 94 | ~10.5 | >10 | >2 | >80 |
| $La_{.83}Sr_{.16}Cr_{.98}Fe_{.02}O_3$ (LSFeC) | 1680° C. | 94 | 9.8–11.0 | 1.5–3 | 0.3 | 90 |
| $La_{.xs}Sr_{.16}Cr_{.98}Fe_{.02}O_3$ $xs = 0.85–0.87$ ($L_{xs}FeC$) | 1680° C. | 96 | 9.6 | 2.5–4 | 0.3 | 90 |
| $La_{.83}Ca_{.16}Cr_{.90}Co_{10}O_3$ (L3C) | 1500° C. | 98 | 10–12.8 | 23–30 | 1.7 | 70 |
| $Y_{.83}Ca_{.16}Cr_{.84}Co_{16}O_3$ (Y3C) | 1450° C. | 98 | 10–11.7 | 23–30 | 1.7 | 60 |
| $La_{.83}Sr_{.13}Ca_{.03}CrO_3$ (LS2C) | 1650° C. | 94 | 9.6–10.6 | 13–23 | 3–6 | 90 |

The composition identified as LS2C (lanthanum strontium calcium chromite) has the best properties of the various compositions tested.

The LS2C composition has excellent gas impermeability, which is critical so that there is no "leaking" of fuel gas in molecular form through the interconnect, especially to the oxygen side since combustion at the cathode side not only decreases electrical efficiency (reduced oxygen ion migration) but it also tends to destroy the cathode materials. A similar leakage of molecular oxygen from the air side to the fuel side through the interconnect will decrease electrical efficiency. The LS2C compositions can be pressureless sintered in air to a density of >94% of theoretical.

Not only does the coefficient of thermal expansion (CTE) of LS2C match closely that of zirconia, it has a very uniform CTE over a wide temperature range.

While the electrical conductivity of LS2C in air is not particularly advantageous when compared to compositions L3C and Y3C, and had the material been tested in air only it might have been discarded as an interconnect candidate, the conductivity and stability thereof in fuel is especially good, often an order of magnitude better than any of the other LSC materials tested in fuel. Such good conductivity in fuel was not predictable, especially since its conductivity in air was poorer than either L3C or Y3C. Since there is air on one side of the interconnect and gas on the other side, it is necessary that an interconnect material have good conductivity in both air and gas.

LS2C was the only material tested which met minimum conductivity criteria for both air and fuel.

The unique interconnect compositions of the instant invention may be formed in various ways, as set forth in Table 3.

TABLE 3

POWDER SYNTHESIS TECHNIQUES

| Technique | Advantages | Disadvantages |
|---|---|---|
| Gel Process | • Established Technology<br>• Moderately Scaleable<br>• Provides Active Powder | • Expensive Precursors<br>• $NO_x$ Evolution/Pollution |
| Solid State | • Industrial Scale Production<br>• Inexpensive Raw Materials/Processing | • Poor Phase Homogeneity<br>• Low Activity Powder |
| Co-precipitation | • Provides Active Powder<br>• High Production Capacity<br>• Good Stoichiometric Control | • Large Volume Reduction During Calcining |
| Glycine-Nitrate | • Highly Reactive Powder<br>• Good Homogeneity | • Very Low Production<br>• Expensive Precursors |

For the purposes of the instant invention, a gel process method for the type generally employed in the preparation of ceramic powders, which provides a homogeneous reactive powder, has generally been preferred, although any other process involving liquid precursors which insure chemical homogeneity on the molecular level are desirable as a method of powder preparation. The initial powder, as contained from the gel process, however, is frequently unacceptable for part fabrication and must be optimized by proper calcining and milling procedures.

Extending calcining at high temperature allows for particle coarsening and eliminates the ultra-fine <0.1 μm particulates that are a result of the gel process. The powder is then reactivated by ball milling and optimally has a final particle size of 0.9 to 0.7 μm and a surface of area of 6.0 to 6.5 m²/g. This combination of size and surface area creates a highly active powder than can be easily consolidated by uniaxial pressures of 5 to 15 ksi with a green density in excess of 55% TD. Sintering these parts at 1600 to 1680° C. for 2 hours leads to a final density of >95%.

TABLE 4

FABRICATION APPROACHES FOR INTERCONNECT MATERIALS

| Approach | Examples | Key Fabrication Technology | Results |
|---|---|---|---|
| Sintering Aids | LSC + $MgF_2$<br>LSC + $CoCl_3$<br>LSC + $CaCrO_4$ | • Uniform Mixing<br>• Sinter at 1500° C. | • 94% TD<br>• Precipitation of Liquid Phase at Grain Boundary |
| Eutectic Liquid Phase | La(Ca, Co)$CrO_3$<br>Y(Ca, Co)$CrO_3$ | • Minimal Calcining<br>• Reduced Milling<br>• Sinter at 1450° C. | • 97% TD<br>• Reactive with Setter Materials<br>• Warpage |
| Hot Pressing | Any $LaCrO_3$ | • Minimal Powder Preparation<br>• Sinter at 1450° C. | • Very Low Yield<br>• Extensive Side Reactions |
| Calcining and Milling | LSC<br>LSFeC<br>LS2C<br>$L_{xs}$FeC | • Moderate Calcining<br>• Vigorous Milling<br>• Sinter at 1650° C. | • 95% TD<br>• Easy Handling<br>• Flat<br>• High Yields |

While sintering aids promote liquid phases in the sintering process, these may result in adverse conditions at the grain boundaries or in adverse high temperature instability.

Thus, preferred powders useful in forming interconnects of LS2C are preferably made by a gel process, following by calcining and milling as described herein. Such powders preferably have a particle size of about 0.6 to 1.0 $\mu$m and preferably a surface area of about 5.5 to 7.0 $m^2/g$. Also, such powder preferably has no low melting ingredients.

Although it is preferred to make the LS2C powders via a gel process and proper calcining and milling, other techniques may be utilized as long as the powder is active, i.e., having the particle size and surface area described above.

Interconnects formed via the powder and processing techniques described herein can be formed in various shapes by uniaxial pressing and conventional sintering. It is advantageous that densities >~95% TD can be obtained without hot pressing, which tends to limit the types of shapes formed.

In an alternative embodiment of the invention, which addresses the chemically, induced warpage problem discussed hereinabove, alkaline earth (Sr, Mg, Ca, etc.) doped chromites; Al, Zr, Ti, or Gd-doped chromites and Sr/Mg co-doped chromites were synthesized using known gel processing techniques. Gel processing ensures homogeneous distribution of dopants on an atomic scale. The gel processing technique involves dissolution of nitrate salts of the reactant cations in water. The solutions for each component are then mixed in the proper stoichiometric ratio. Citric acid and ethylene glycol are added to the solution and the entire mixture is thermally decomposed on a hot plate. The resulting "char" is then calcined at high temperatures (800–1100° C.) to yield the final product. This route produces a homogenous, fine grained material suitable for further ceramic processing. A discussion of an example of this process may be found in Pechini, U.S. Pat. No. 3,330,697.

To estimate the ionic leakage current, the chemical coefficient of expansion of the material was measured. The chemical coefficient was defined by the dilation in the bulk dimensions of the interconnect owing to loss of oxygen from the lattice in reducing atmosphere conditions.

The measurements were obtained using a vertical linear dilatometer with controlled atmosphere capability. In the tests, a sintered bar sample of interconnect material was placed within the dilatometer and heated to typical stack operating temperatures in air. After equilibrium was achieved, the samples were exposed to 3% $H_2$ in argon. This gas composition has a similar $pO_2$ as SOFC fuel. The linear change in length was monitored over time until equilibrium was again achieved. The percent change in linear dimension after exposure to the reducing gas is the chemical coefficient of expansion (CCE). A comparison of this parameter allowed an effective determination of the optimal composition range that simultaneously minimized leakage and warpage, and maximized electronic conductivity, stability and densification. Results for the compositions evaluated are given in Table 5 along with total conductivity as measured in air and fuel. From these measurements, it is evident that Sr/Mg doped chromites meet most closely the functional requirements of an SOFC interconnect.

TABLE 5

PROPERTY EVALUATIONS IN LANTHANUM CHROMITE COMPOSITIONS

| Composition | Conductivity in Air S/cm at 1000° C. | Conductivity in Fuel S/cm at 1000° C. | Thermal Expansion to 1000° C. ppm/° | CCE at 1000° in 3% $H_2$ - Argon |
|---|---|---|---|---|
| $La_{.83}Sr_{.13}Ca_{.03}CrO_3$ | 15–25 | 2–6 | 10.1 ± 0.2 | 0.135% (0.133%) |
| $La_{.83}Sr_{.16}Ca_{.98}Fe_{.02}O_3$ | 15 | <1 | 10.4 | 0.088% |
| $La_{.99}Mg_{.1}Cr_{.9}O_3$ | 8–10 | 1–2 | 8.9 | 0.05% |
| $La_{.99}Mg_{.2}Cr_{.8}O_3$ | 4.44 | 0.45 | 9.5 | 0.077% |
| $La_{.94}Sr_{.05}Mg_{.1}Cr_{.9}O_3$ | 9.66 | 2.34 | 9.8 | 0.046% |
| $La_{.89}Sr_{.1}Mg_{.1}Cr_{.9}O_3$ | 15–24 | 2.0–3.5 | 10.6 | 0.10% |
| $La_{.99}Mg_{.1}Al_{.3}Cr_{.6}O_3$ | 3.85 | 0.101 | 10.4 | 0.07% |
| $La_{.97}Sr_{.02}Mg_{.1}Al_{.28}Cr_{.62}O_3$ | 2.63 | 0.105 | 10.61 | 0.14% |
| $La_{.97}Sr_{.05}Mg_{.1}Al_{.25}Cr_{.6}O_3$ | 5.379 | 0.158 | 10.60 | 0.16% |
| $La_{.89}Sr_{.1}Mg_{.1}Al_{.20}Cr_{.7}O_3$ | 8.27 | 0.245 | 10.61 | 0.23% |
| $La_{.63}Gd_{.2}Sr_{.16}CrO_3$ | 22.4 | 3.99 | 9.37 | 0.14% |
| $La_{.99}Mg_{.1}Cr_{.85}Al_{.05}O_3$ | 5.33 | 0.73 | 9.40 | 0.050% |
| $La_{.99}Mg_{.1}Cr_{.8}Al_{.10}O_3$ | 8.33 | 0.86 | 9.90 | 0.065% |
| $La_{.99}Mg_{.1}Cr_{.85}Fe_{.05}O_3$ | 5.86 | 1.01 | 9.23 | 0.035% |
| $La_{.99}Mg_{.1}Cr_{.8}Fe_{.1}O_3$ | 4.02 | 0.61 | 9.32 | 0.044% |

TABLE 5-continued

PROPERTY EVALUATIONS IN LANTHANUM CHROMITE COMPOSITIONS

| Composition | Conductivity in Air S/cm at 1000° C. | Conductivity in Fuel S/cm at 1000° C. | Thermal Expansion to 1000° C. ppm/° | CCE at 1000° in 3% $H_2$ - Argon |
|---|---|---|---|---|
| $La_{.89}Sr_{.1}Mg_{.1}Cr_{.85}Fe_{.05}O_3$ | 10.4 | 0.87 | — | — |
| $La_{.89}Sr_{.1}Mg_{.1}Cr_{.8}Fe_{.1}O_3$ | 12.5 | 1.01 | 9.87 | 0.07% |
| $La_{.99}Mg_{.1}Cr_{.85}Ti_{.05}O_3$ | 6.18 | 0.35 | — | — |
| $La_{.99}Mg_{.1}Cr_{.80}Ti_{.10}O_3$ | 0.62 | 0.56 | 9.02 | 0.025% |
| $La_{.93}Sr_{.13}Ca_{.03}Cr_{.9}Fe_{.1}O_3$ | 25.08 | 2.58 | 9.85 | 0.13% |
| $La_{.83}Sr_{.13}Mg_{.03}Cr_{.81}Zr_{.19}O_3$ | 4.91 | 0.063 | 9.13 | 0.039% |
| $La_{.75}Nd_{.08}Sr_{.13}Ca_{.03}CrO_3$ | 22.2 | 1.49 | 9.20 | 0.14% |
| $La_{.99}Mg_{.1}Cr_{.9}O_3$ | 9.01 | 1.34 | 9.0 | 0.064% |
| Target | >8 | >1 | 10.5 ± 0.5 | <0.05% |

Figure 7:
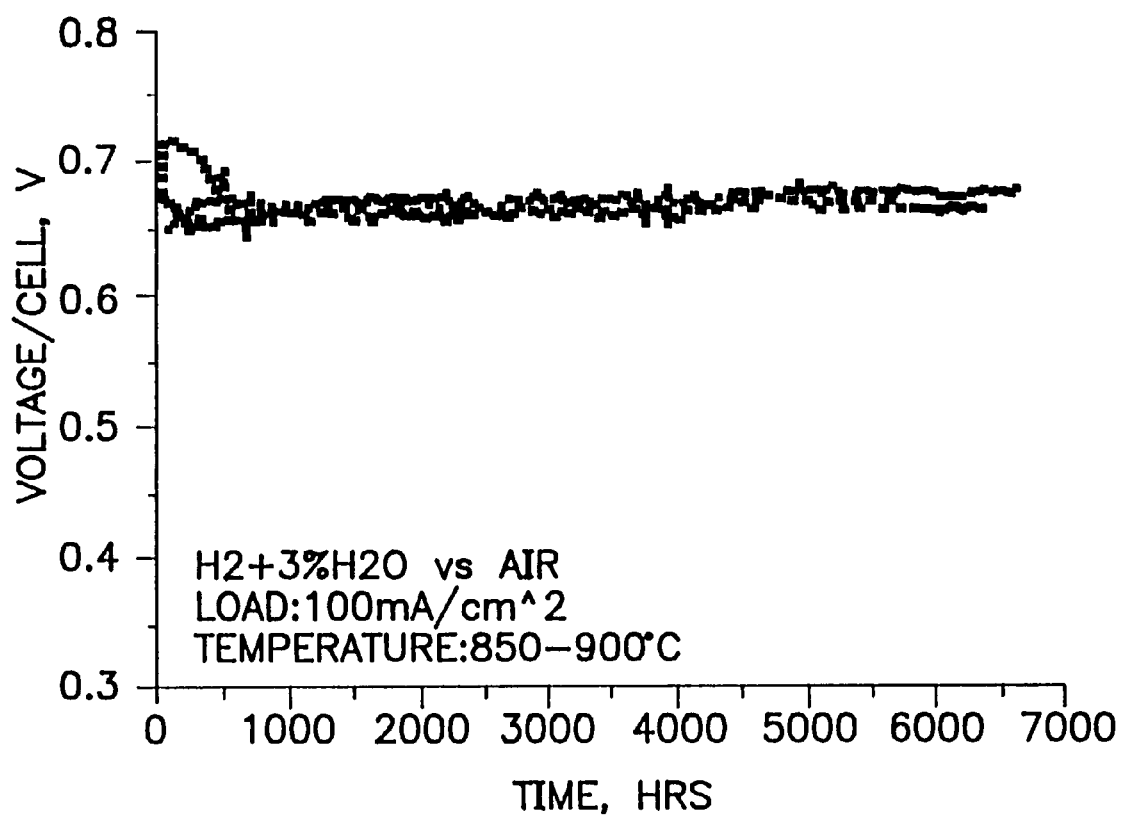
FIG. 7 is a plot of performance stability of an SOFC stack employing an improved interconnect according to a preferred embodiment of the present invention.
Figure 8:
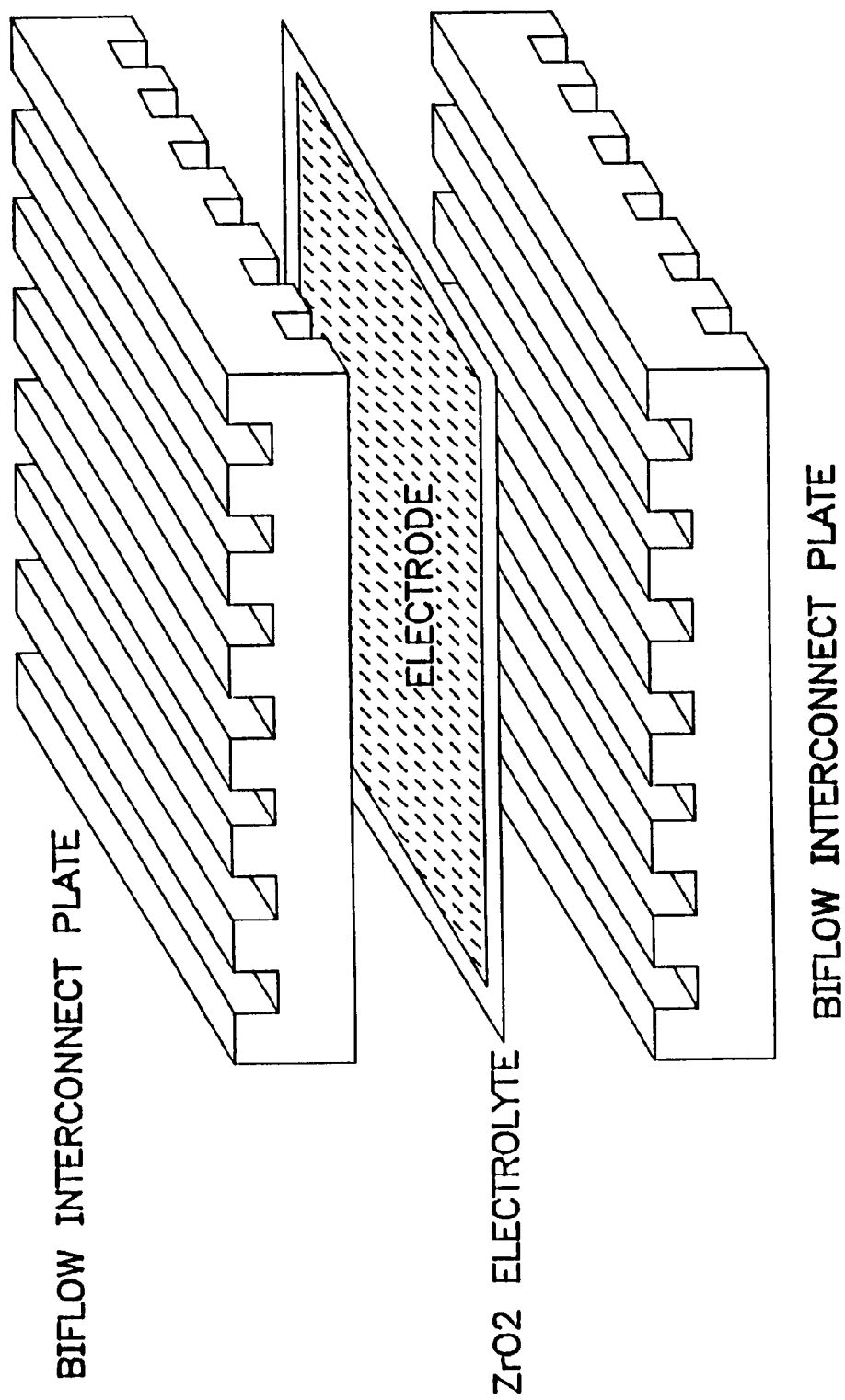
FIG. 8 is a perspective exploded schematic of a planar solid oxide fuel cell stack element, as contemplated for use with the interconnect of the present invention.

From the data of Table 5, Sr and Mg co-doped chromites were found to exhibit the best combination of properties necessary for successful function of fuel cell interconnects. The desired properties were exhibited only for a narrow range of composition and compositional variations beyond these limits prohibited obtaining these desired properties. This is exemplified by the performance of experimental SOFC stacks with interconnect materials made of this composition. As shown in FIG. 7, stability of multiple stacks has exceeded 6000 hrs and is expected to continue for at least 50,000 hours.

The co-doping of the interconnect material with Sr and Mg simultaneously has several effects. The addition of Mg results in an increase in the electronic conductivity of the interconnect. The addition of Sr improves sinterability, increases thermal expansion, and also increases electronic conductivity. However, the incorporation of Sr also increases oxygen leakage current, so Sr is not necessarily a suitable dopant by itself and/or at high dopant levels.

The preferred form for the improved, warpage resistant interconnect material may be represented as $A_{1-x-y-\alpha}(B)_xC_yCr_{1-z}Mg_zO_3$, where A is La or Y, (x+y) varies from 0 to 0.2; B is from the alkaline earth family, preferably Sr, and x varies from 0.0 to 0.15; C is also from the alkaline earth family, preferably Ca, and y varies from 0 to 0.05, and z varies from 0 to 0.2. Preferably, the ratio of (A+B+C)/(Cr+Mg) is less than or equal to 1, more preferably 0.99, and most preferably not less than 0.9. $\alpha$ has a value in the range of 0 to 0.1.

An alternative expression for the improved interconnect material is $La_{.99-x}Sr_xCr_{1-y}Mg_yO_{3-\delta}$, where x varies from 0.0–0.10. The delta ("$\delta$") is present in acknowledgement that in all of the interconnect materials described herein, the oxygen content will be slightly off stoichiometry depending upon the temperature and the dopant material. Accordingly, no specific value for $\delta$ can be assigned, but in all cases, the value will be sufficiently small to be treated as zero for most practical applications.

A preferred specific composition, which is believed, at this time, to present optimal operating characteristics for use as an interconnect in SOFCs, is $La_{0.94}Sr_{0.05}Cr_{0.9}Mg_{0.1}O_3$. Such a composition, when formed as an interconnect structure for SOFC applications, is believed to have superior electrical conductivity, stability to reducing gases, and favorable thermal expansion characteristics. An interconnect, constructed of this material, is expected to have an electrical conductivity in air of 20 S/cm and in fuel of 2 S/cm at 1000° C., and, as stated previously, functional stability at operating conditions, at up to 50,000 hrs of operation.

A further embodiment of the invention comprises an electroconductive conducting interconnect having a composition with a thermal coefficient of expansion substantially equivalent to zirconia, wherein a doped chromite ceramic composition is provided having the formula $La_{0.99-x}Sr_xCr_{1-y}Mg_yO_{3-\delta}$, wherein x has a value in the range of 0.0–0.10;

y has a value in the range of 0.0–0.2; and $\delta$ has a value in the range of 0.0–0.15.

A still further alternative embodiment of the invention is an electroconductive conducting composition having a thermal coefficient of expansion substantially equivalent to zirconia wherein:

a doped chromite ceramic composition is provided having the formula $La_{0.99-x}Sr_xCr_{1-y}Mg_yO_{3-\delta}$, wherein x has a value in the range of 0.0–0.10;

y has a value in the range of 0.0–0.2; and $\delta$ has a value in the range of 0.0–0.15.

Preferred techniques for the manufacture of interconnects according to the present invention would involve the formation of the net shape by dry pressing using conventional ceramic processing techniques or by tape casting followed by lamination, or high pressure injection molding.

The foregoing description and drawings merely explain and illustrate the invention and the invention is not limited thereto except insofar as the appended claims are so limited, as those skilled in the art who have the disclosure before them will be able to make modifications and variations therein without departing from the scope of the invention.

We claim:

1. An electroconductive conducting interconnect having a composition with a thermal coefficient of expansion substantially equivalent to zirconia comprising:

a doped chromite ceramic composition having the formula $La_{0.99-x}Sr_xCr_{1-y}Mg_yO_{3-\delta}$, wherein x has a value in the range of $0.0 < x \leq 0.10$;

y has a value in the range of $0.0 < y \leq 0.2$ ; and $\delta$ has a value in the range of 0.0–0.15.

2. An electroconductive conducting composition having a thermal coefficient of expansion substantially equivalent to zirconia comprising:

a doped chromite ceramic composition having the formula $La_{0.99-x}Sr_xCr_{1-y}Mg_yO_{3-\delta}$, wherein x has a value in the range of $0.0 < x \leq 0.10$;

y has a value in the range of $0.0 < y \leq 0.2$; and $\delta$ has a value in the range of 0.0–0.15.

3. The interconnect according to claim 1, having a specific formula of $La_{0.94}Sr_{0.05}Cr_{0.9}Mg_{0.1}O_3$.

4. The composition according to claim 2 having a specific formula of $La_{0.94}Sr_{0.05}Cr_{0.9}Mg_{0.1}O_3$.

5. The interconnect according to claims 1, having an electrical conductivity in air of 20 S/cm and in fuel of 2 S/cm at a temperature of approximately 1000° C.

* * * * *